United States Patent
Lin

(10) Patent No.: US 6,546,943 B2
(45) Date of Patent: Apr. 15, 2003

(54) STRUCTURE FOR FOLDING ORCHARD TENT FOR PROTECTION AGAINST TRAIN

(76) Inventor: Zong-Tsan Lin, No. 208, Fong-Dong Road, Fong-Yuan, Taichung (TW)

( * ) Notice: Subject to any disclaimer, the term of this patent is extended or adjusted under 35 U.S.C. 154(b) by 5 days.

(21) Appl. No.: 09/842,093

(22) Filed: Apr. 26, 2001

(65) Prior Publication Data

US 2001/0035204 A1 Nov. 1, 2001

(30) Foreign Application Priority Data

Apr. 29, 2000 (CN) ........................................ 00217491 U

(51) Int. Cl.$^7$ .............................................. E04H 15/30
(52) U.S. Cl. ........................ 135/95; 135/115; 135/156
(58) Field of Search ........................... 135/90, 95, 122, 135/156, 115; 296/100.11, 100.12, 100.13

(56) References Cited

U.S. PATENT DOCUMENTS

| | | | | |
|---|---|---|---|---|
| 2,118,474 A | * | 5/1938 | Morton | 135/115 |
| 2,140,220 A | * | 12/1938 | Colvin, Jr. | 135/115 |
| 2,603,171 A | * | 7/1952 | Smith | 135/122 |
| 3,756,650 A | * | 9/1973 | Michel | 296/100.12 |
| 4,067,603 A | * | 1/1978 | Fenton | 296/100.13 |
| 4,162,100 A | * | 7/1979 | Muscillo | 296/100.12 |
| 4,982,534 A | * | 1/1991 | Saitoh et al. | 135/156 |
| 5,004,032 A | * | 4/1991 | Pedersen | 296/100.12 |
| 5,080,423 A | * | 1/1992 | Merlot et al. | 296/100.13 |
| 5,102,182 A | * | 4/1992 | Haddad, Jr. | 296/100.13 |
| 5,145,230 A | * | 9/1992 | Biancale | 296/100.13 |
| 5,862,633 A | * | 1/1999 | Van Ells | 135/95 |
| 6,142,554 A | * | 11/2000 | Carroll et al. | 296/100.11 |

FOREIGN PATENT DOCUMENTS

| | | | | |
|---|---|---|---|---|
| EP | 27102 | * | 4/1981 | 296/100.13 |
| EP | 577892 | * | 1/1994 | 296/100.12 |
| JP | 60018485 | * | 1/1985 | 135/122 |

* cited by examiner

*Primary Examiner*—Lanna Mai
*Assistant Examiner*—Hanh V. Tran
(74) *Attorney, Agent, or Firm*—Browdy and Neimark, P.L.L.C.

(57) ABSTRACT

An orchard tent folding structure comprises two frame sets and a shelter member having a plurality of tubular members and a plastic cloth. The frame sets comprise a rod member which is provided with a power source to drive the rod member to turn, a sprocket wheel and a slide wheel linked with the sprocket wheel by a chain member. The sprocket wheel turns along with the rod member. The chain member is formed of a chain section and a steel cable section. The shelter member is fastened at one side with the chain section, and at other side with a first steel cable and a second steel cable of the frame sets.

2 Claims, 5 Drawing Sheets

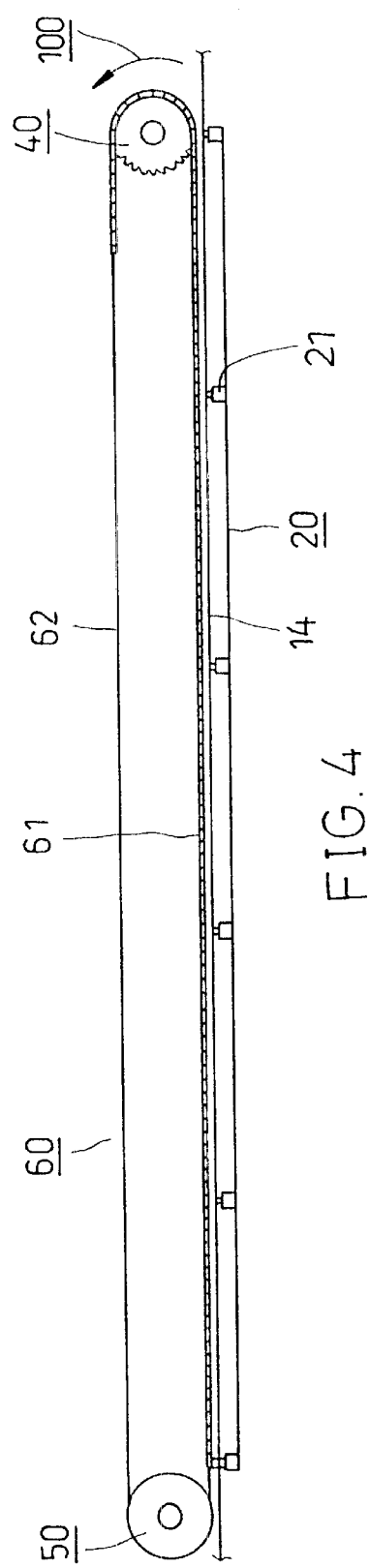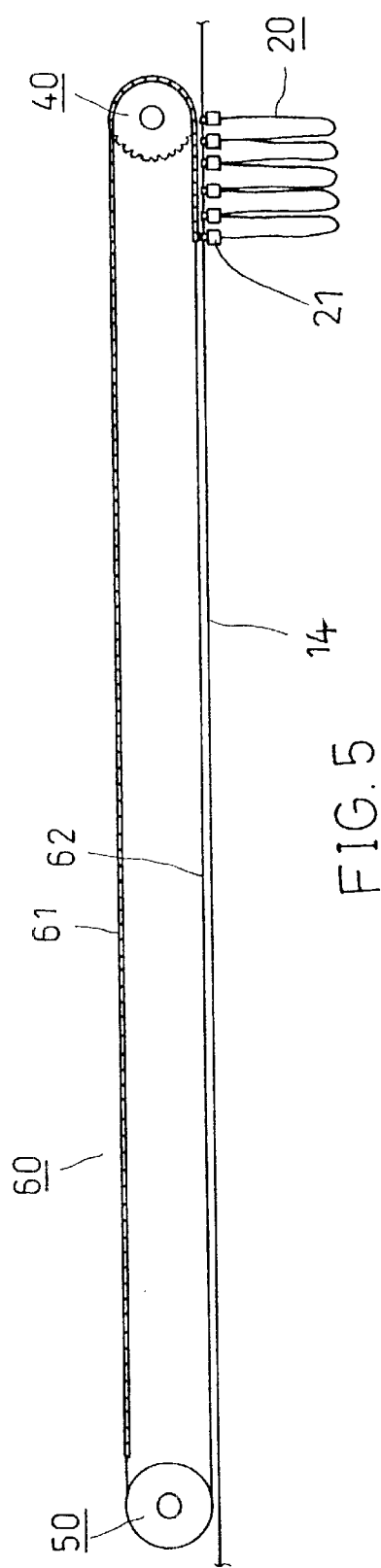

US 6,546,943 B2

STRUCTURE FOR FOLDING ORCHARD TENT FOR PROTECTION AGAINST TRAIN

FIELD OF THE INVENTION

The present invention relates generally to a cultivation equipment of fruit trees, and more particularly to a structure for folding an orchard tent which is intended to provide the orchard with protection against the rain.

BACKGROUND OF THE INVENTION

The conventional way of growing the fruit frees is generally carried out in the open field without a shade for protection against the rain, which is often a culprit for various diseases of the fruit trees.

The use of pesticide or fungicide is a common practice for controlling the pathology of the fruit trees. However, in light of the pesticide or fungicide being harmful to the environment in which we live, the fruit farmers have a propensity to use as little pesticide or fingicide as possible. For this reason, an orchard tent is commonly used by the fruit farmers to provide fruit trees with protection against the rain, so as to minimize the pathological incident in the orchard. In addition, the orchard tent serves to reduce the frequency of spraying fungicide or pesticide in view of the fact that the fungicide or pesticide is apt to wash away by the rain. As a result of reduction in frequency and quantity of the pesticide or fungicide that is sprayed, there will be less residue of the pesticide or fungicide on the fruit.

The conventional orchard tent must be erected on site. The erection of the conventional orchard tent is rather time-consuming.

This inventor of the present invention discloses in the People's Republic of China utility model Patent No.ZL 00217491.X an orchard tent which is intended to provide protection against the rain. However, the orchard tent so disclosed also works to shield the sunlight which is essential to the photosynthesis of fruit trees. As a result, the orchard tent must be rolled up on a sunny day, so as to enable the fruit trees in the orchard to be exposed to the sunlight. The orchard tent is rather cumbersome and is set up at a considerable height, thereby making it difficult to be folded manually.

SUMMARY OF THE INVENTION

The primary objective of the present invention is to provide an orchard tent with a folding structure to facilitate the folding of the orchard tent that is erected in the orchard to provide fruit trees with protection against the rain.

The features, functions, and advantages of the present invention will be readily understood upon a thoughtful deliberation of the following detailed description of two preferred embodiments of the present invention with reference to the accompanying drawings.

DETAILED DESCRIPTION OF THE PREFERRED EMBODIMENTS

Figure 1:
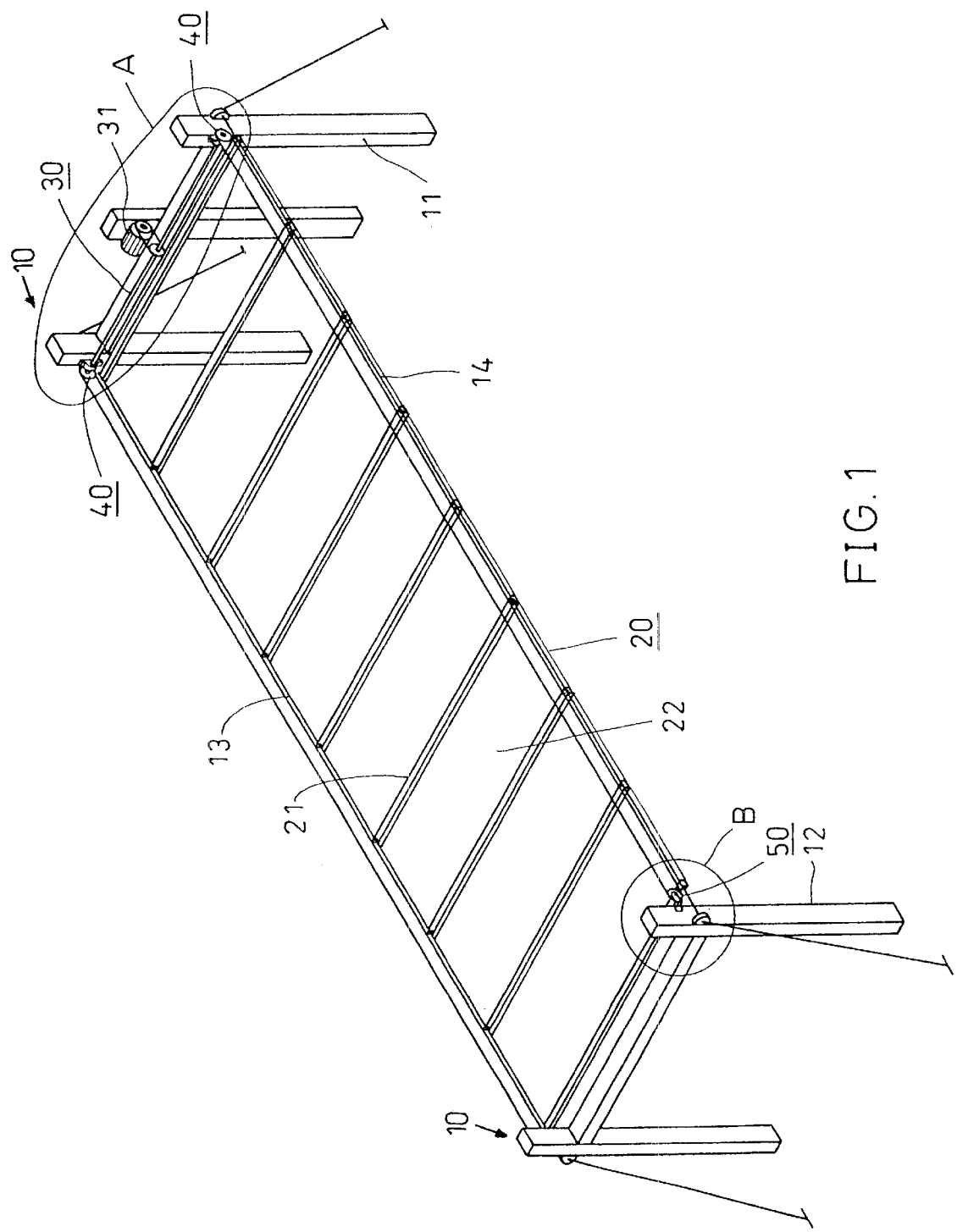
FIG. 1 a perspective view of a first preferred embodiment of the present invention.
Figure 2:
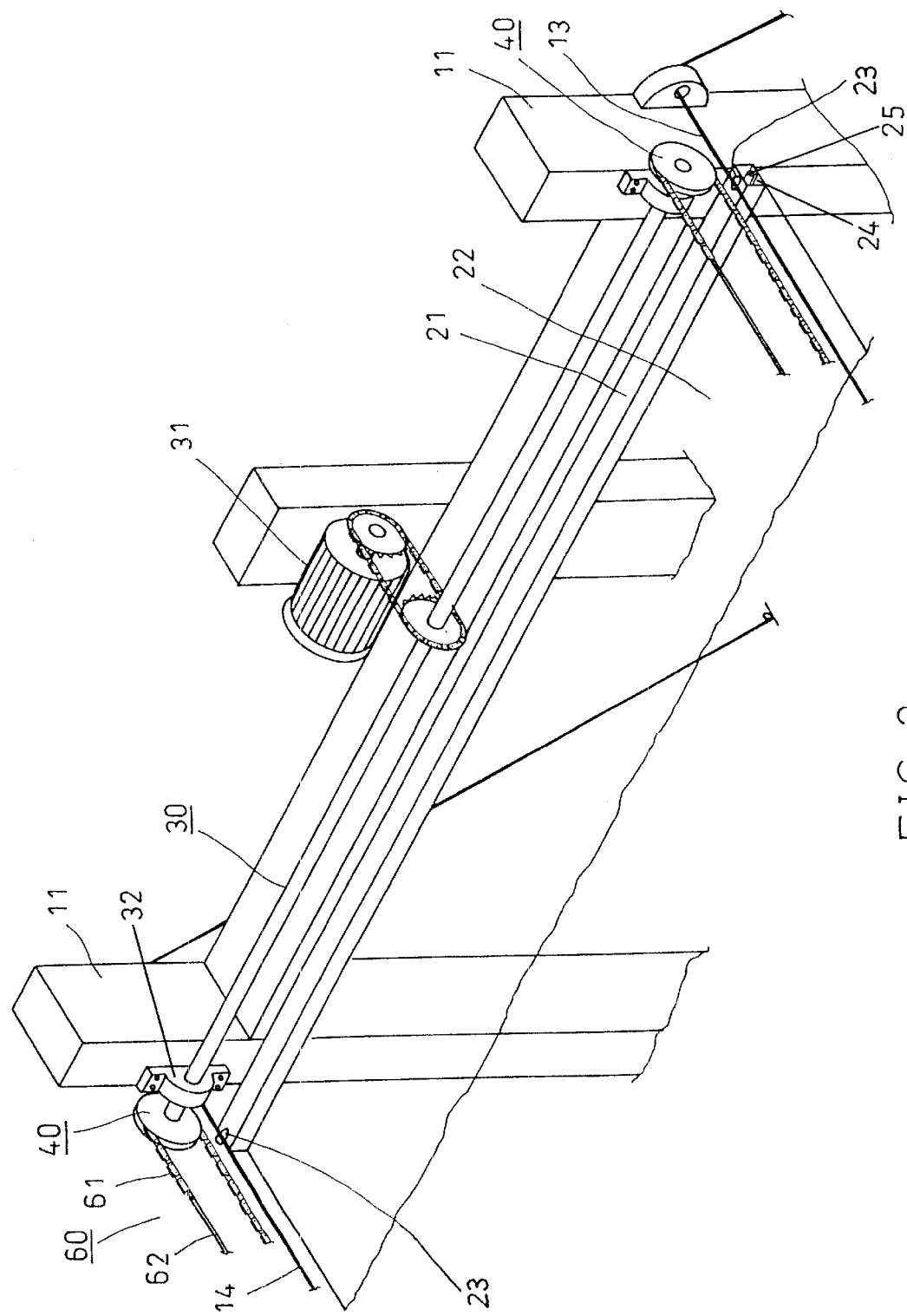
FIG. 2 shows a schematic view of a portion indicated by an "A" circle as shown in FIG. 1.
Figure 3:
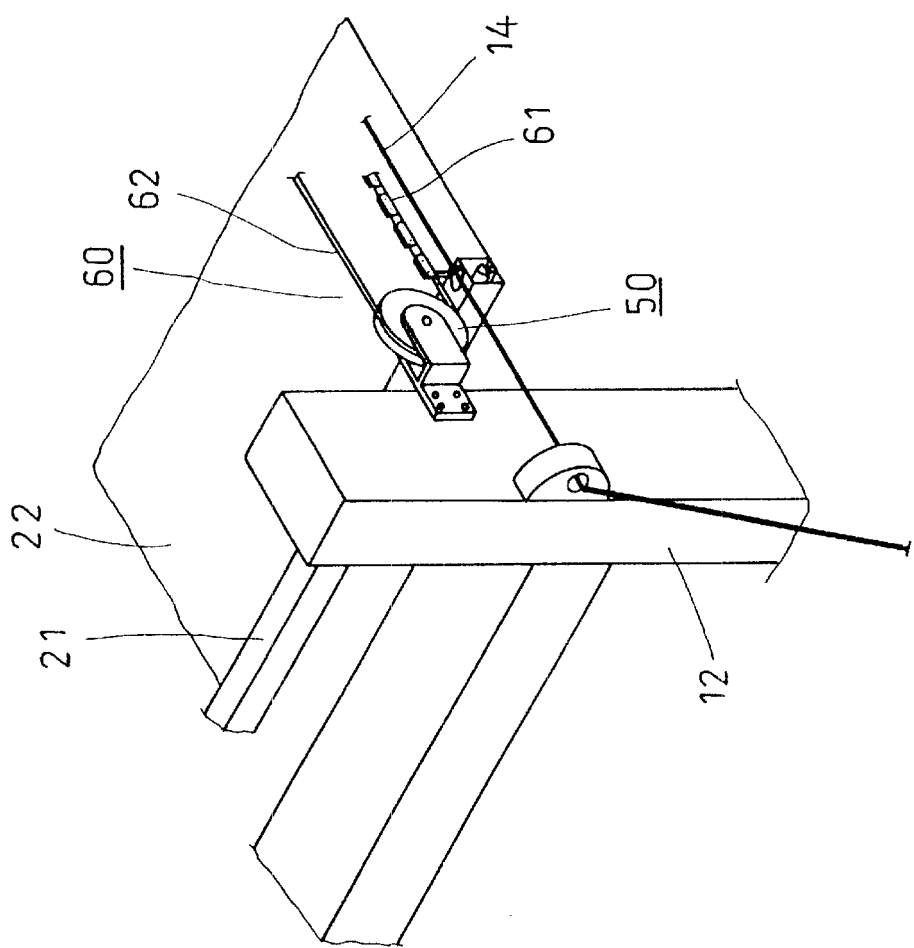
FIG. 3 shows a schematic view of a portion indicated by a "B" circle as shown in FIG. 1, FIGS. 4 and 5 are schematic views of the present invention in operation.

As shown in FIGS. 1–5, an orchard tent folding structure of the first preferred embodiment of the present invention comprises the component parts which are described hereinafter.

Two frame sets 10 comprise a first support 11 and a second support 12 separated from the first support 11 by a predetermined distance. A first steel cable 13 is mounted on the top of one side of the first and the second supports 11 and 12. A second steel cable 14 is mounted on other side of the first and the second supports 11 and 12 such that the second steel cable 14 is parallel to the first steel cable 13.

A shelter member 20 comprises a predetermined number of tubular members 21 and a transparent plastic cloth 22. The tubular members 21 are provided in the underside with a notch 24 extending along the longitudinal direction thereof. The transparent plastic cloth 22 is spread out by means of a plurality of soft plastic bars 25 which are inserted into the notches of the tubular members 21. Each tubular member 21 is provided on the top of two longitudinal ends thereof with a safety hook 23. The safety hooks 23 of the shelter member 20 catch the steel cables 13 and 14 before the plastic cloth 20 is completely spread out.

A rod member 30 is rotatable at both ends in supports 32 engaged on the inner side of the top segment of the first support 11 and is provided at the midsegment with a power source 31, which is a motor, for driving the rod member 30 to turn at a predetermined revolution.

Two sprocket wheels 40 are respectively mounted on two outer ends of the rod member 30 such that the sprocket wheels 40 turn along with the rod member 30.

Two slide wheels 50 are respectively pivoted to the inner side of the top segment of two sides of the second support 12 such that the two slide wheels 50 are corresponding in location to the two sprocket wheels 40.

Two slide wheels 50 are respectively rotatable on the inner side of the top segment of two sides of the second support 12 such that the two slide wheels 50 are corresponding in location to the two sprocket wheels 40.

Figure 6:
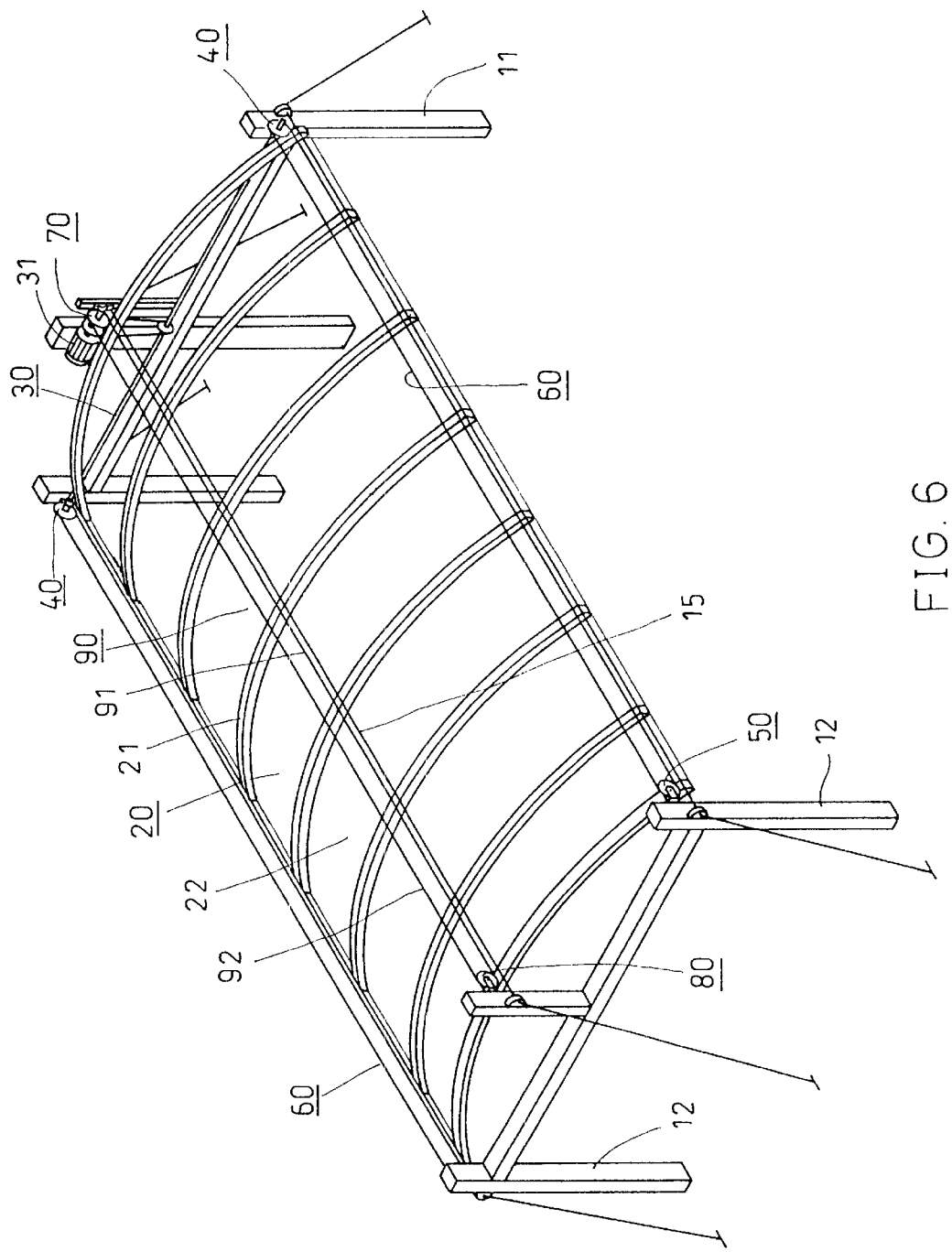
FIG. 6 shows a perspective view of a second preferred embodiment of the present invention.

As shown in FIG. 6, an orchard tent folding structure of the second preferred embodiment of the present invention is different from the first preferred embodiment of the present invention in design in that the former comprises a plurality of arcuate tubular members 21, which enable the plastic cloth 22 to spread out to shape like an arch. In order to facilitate the folding of the orchard tent, the shelter member 20 of the second preferred embodiment of the present invention is provided at the center of the top thereof with a third steel cable 15. In the meantime, each tubular member 21 is provided at the center of the top thereof with a safety hook for catching the third steel cable 15. In addition, the first support 11 is provided in the inner side of the midsegment thereof with an upper sprocket wheel 70. The second support 12 is provided in the inner side with an upper slide wheel 80 opposite to the upper sprocket wheel 70. The upper sprocket wheel 70 and the upper slide wheel 80 are linked by a chain member 90. As the power source 31 is started, both the rod member 30 and the upper sprocket wheel 70 are actuated to turn.

The left side of the shelter member 20 is fastened with the left end of the chain section 61. The front and the rear ends of the right side of the shelter member 20 are respectively fastened with the first steel cable 13 and the right end of the second steel cable 14.

On a sunny day, the power source 31 is started to actuate the rod member 30 to rotate in a counterclockwise direction indicated by and arrow 100 as shown in FIG. 4. As a result, the chain section 61 of the chain member 60 is pulled rightwards by the sprocket wheel 40. As the shelter member 20 is in the unfolded state, the left side of the shelter member 20 is fastened with the left end of the chain section 61 of the chain member 60. As a result, the shelter member 20 moves rightwards at an appropriate speed along with the chain section 61 such that the shelter member 20 is completely pulled to the right end as shown in FIG. 5. On a rainy day, the power source 31 is started to actuate the rod member 30 to rotate in a clockwise direction, so as to pull the shelter member 20 back to be in the unfolded state as shown in FIG. 4.

The power source 31 of the present invention may be controlled by a remote control device.

As shown in FIG. 6, an orchard tent folding structure of the second preferred embodiment of the present invention is different from the first preferred embodiment of the present invention in design in that the former comprises a plurality of arcuate tubular members 21, which enable the plastic cloth 22 to spread out to shape like an arch. In order to facilitate the folding of the orchart tent, the shelter member 20 of the second preferred embodiment of the present invention is provided at the center of the top thereof with a third steel cable 15. In the meantime, each tubular member 21 is provided at the center of the top thereof with a safety hook for catching the third steel cable 15. In addition, the first support 11 is provided in the inner side of the midsegment thereof with an upper sprocket wheel 70. The second support 12 is provided in the inner side with an upper slide wheel 80 opposite to the upper sprocket wheel 70. The upper sprocket wheel 70 and the upper slide wheel 80 are linked by a chain member 90. As the power source 31 is started, both the rod member 30 and the upper sprocket wheel 70 are actuated to turn.

The chain member 90 also has a chain section 91 and a steel cable section 92.

What is claimed is:

1. An orchard tent folding structure comprising:

a first support, and a second support separated from said first support by a predetermined distance, a pair of parallel steel cables fixed between the first support and the second support, a plurality of tubular members each having a notch extending on an underside along a longitudinal length thereof and safety hooks on an upperside of opposite ends thereof, each of the plurality of tubular members being slidably engaged below and between the pair of parallel steel cables by the safety hooks, each of the plurality of tubular members having a plastic bar engaged within the notch with a transparent plastic cloth engaged between each said plastic bar to form a shelter member, said first support having a rod member rotatable engaged thereon, said rod member having a power source to drive said rod member to rotate at a predetermined revolution, said rod member provided at two outer ends with a sprocket wheel mounted thereon to turn along with said rod member;

a pair of slide wheels rotatably mounted on said second support respectively coplanar with said sprocket wheels, said sprocket wheels and said slide wheels being respectively linked by an endless member which has a chain section and a steel cable section, said chain section extending from a first end thereof from a bottom edge of said slide wheel toward said sprocket wheel so that a second end thereof engages with said sprocket wheel;

wherein a first end of said shelter member is fixed at each said first end of said chain section, and a second end of said shelter member is fixed to each of said pair of steel cables.

2. The structure as defined in claim 1, wherein said tubular members have an arcuate construction enabling said plastic cloth to form an arch when said plastic cloth is fully spread out, each of said tubular members having a safety hook at the center of a top thereof slidably engaging a third steel cable fixed between the first support and the second support; said first support having an upper sprocket wheel at a center thereof; said second support having an upper slide wheel coplanar to said upper sprocket wheel linked with said upper sprocket wheel by a third chain member, wherein said rod member and said upper sprocket wheel are actuated synchronously by said power source to turn.

* * * * *